United States Patent
Breedvelt-Schouten

(10) Patent No.: US 10,268,773 B2
(45) Date of Patent: Apr. 23, 2019

(54) NAVIGATING A WEBSITE USING VISUAL ANALYTICS AND A DYNAMIC DATA SOURCE

(71) Applicant: International Business Machines Corporation, Armonk, NY (US)

(72) Inventor: Ilse M. Breedvelt-Schouten, Manotick (CA)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 14/754,868

(22) Filed: Jun. 30, 2015

(65) Prior Publication Data

US 2017/0004180 A1     Jan. 5, 2017

(51) Int. Cl.
| | | |
|---|---|---|
| G06F 17/30 | (2006.01) | |
| G06Q 50/00 | (2012.01) | |
| G06F 3/0484 | (2013.01) | |
| G06F 3/0482 | (2013.01) | |

(52) U.S. Cl.
CPC ...... *G06F 17/30905* (2013.01); *G06F 3/0482* (2013.01); *G06F 3/04842* (2013.01); *G06F 17/3053* (2013.01); *G06F 17/30539* (2013.01); *G06F 17/30572* (2013.01); *G06F 17/30864* (2013.01); *G06Q 50/01* (2013.01); *G06F 17/30038* (2013.01); *G06F 17/3082* (2013.01); *G06F 17/30731* (2013.01); *G06F 17/30734* (2013.01); *G06F 17/30752* (2013.01); *G06F 2203/04803* (2013.01)

(58) Field of Classification Search
CPC ......... G06F 17/30905; G06F 17/30539; G06F 17/30572; G06F 17/30734
USPC .......................................................... 707/727
See application file for complete search history.

(56) References Cited

U.S. PATENT DOCUMENTS

| | | | |
|---|---|---|---|
| 7,330,845 B2 * | 2/2008 | Lee .................. | G06F 17/30864 |
| 7,386,439 B1 | 6/2008 | Charnock et al. | |
| 7,505,989 B2 | 3/2009 | Gardner et al. | |
| 7,702,635 B2 * | 4/2010 | Horvitz ............. | G06F 17/30867 |
| | | | 705/1.1 |
| 8,359,191 B2 | 1/2013 | Chen et al. | |

(Continued)

FOREIGN PATENT DOCUMENTS

WO     2012152981 A1     11/2012

OTHER PUBLICATIONS

IBM: List of IBM Patents or Patent Applications Treated as Related (Appendix P), Mar. 15, 2016, pp. 1-2.

(Continued)

*Primary Examiner* — Joshua Bullock
(74) *Attorney, Agent, or Firm* — Nicole A. Spence

(57) ABSTRACT

Embodiments of the present invention disclose a method, computer program product, and system for identifying relevant content in a social media website. A social media site is mined for data and that data is stored as a data set. The data set is identified using a computer. A plurality of electronic records of the data set are received, wherein the electronic records are a result of the data mining. A plurality of ontologies is generated based on the electronic records and a subset of the plurality of ontologies is displayed on a user device. A user input is recorded as a user record and the set of ontologies that is displayed is modified.

15 Claims, 5 Drawing Sheets

(56) References Cited

U.S. PATENT DOCUMENTS

| | | | |
|---|---|---|---|
| 8,429,179 B1* | 4/2013 | Mirhaji | G06F 17/30312 |
| | | | 707/756 |
| 8,751,940 B2 | 6/2014 | Rose et al. | |
| 9,053,517 B2 | 6/2015 | Stanton | |
| 9,317,593 B2 | 4/2016 | Marvit et al. | |
| 9,342,854 B2 | 5/2016 | Barbieri et al. | |
| 9,355,172 B2 | 5/2016 | Howes et al. | |
| 9,400,835 B2 | 7/2016 | Setlur | |
| 2009/0027392 A1 | 1/2009 | Jadhav et al. | |
| 2009/0030897 A1 | 1/2009 | Hatami-Hanza | |
| 2009/0049034 A1* | 2/2009 | Gupta | G06F 17/30734 |
| 2009/0287674 A1 | 11/2009 | Bouillet et al. | |
| 2010/0042944 A1 | 2/2010 | Robinson et al. | |
| 2010/0100537 A1 | 4/2010 | Druzgalski et al. | |
| 2011/0040760 A1* | 2/2011 | Fleischman | G06Q 30/02 |
| | | | 707/737 |
| 2011/0113095 A1 | 5/2011 | Hatami-Hanza | |
| 2011/0225115 A1 | 9/2011 | Moitra et al. | |
| 2011/0292046 A1 | 12/2011 | Gotz | |
| 2012/0001919 A1 | 1/2012 | Lumer | |
| 2012/0047448 A1 | 2/2012 | Amidon et al. | |
| 2012/0215903 A1* | 8/2012 | Fleischman | G06Q 30/0201 |
| | | | 709/224 |
| 2012/0284259 A1 | 11/2012 | Jehuda | |
| 2013/0090961 A1 | 4/2013 | Smith | |
| 2013/0311340 A1 | 11/2013 | Krishnan | |
| 2014/0025660 A1 | 1/2014 | Mohammed et al. | |
| 2014/0033063 A1* | 1/2014 | Rose | G06F 17/3089 |
| | | | 715/745 |
| 2014/0096035 A1 | 4/2014 | Hall et al. | |
| 2014/0280121 A1 | 9/2014 | Sharp et al. | |
| 2014/0324835 A1 | 10/2014 | Schiller | |
| 2014/0365484 A1 | 12/2014 | Freeman | |
| 2015/0120782 A1 | 4/2015 | Kim et al. | |
| 2015/0135057 A1 | 5/2015 | Metcalf et al. | |
| 2015/0227559 A1 | 8/2015 | Hatami-Hanza | |
| 2016/0070449 A1 | 3/2016 | Christiansen et al. | |
| 2016/0217128 A1 | 7/2016 | Baum et al. | |

OTHER PUBLICATIONS

U.S. Appl. No. 15/064,655, filed Mar. 9, 2016, entitled: "Navigating a Website Using Visual Analytics and a Dynamic Data Source", pp. 1-25.

IBM: List of IBM Patents or Patent Applications Treated as Related (Appendix P), Sep. 26, 2016, pp. 1-2.

Breedvekt-Schouten, U.S. Appl. No. 15/064,655, filed Mar. 9, 2016, titled: "Navigating a Website Using Visual Analytics and a Dynamic Data Source", pp. 1-25.

Breedvekt-Schouten, U.S. Appl. No. 15/275,673, filed Sep. 9, 2016, titled: "Navigating a Website Using Visual Analytics and a Dynamic Data Source", pp. 1-25.

Atterer et al., "Treemap-Based Website Navigation for Non-Hierarchical, Interlinked Sites: The Trackback Map", Proceedings: NordiCHI 2008, Oct. 20-22, 2008, Short Papers, pp. 411-414.

Glover et al., "Inferring Hierarchical Descriptions", CIKM'02, Nov. 4-9, 2002, pp. 507-514.

Clicky®, "Real Time Web Analytics", http://clicky.com/, printed on Jun. 24, 2015, pp. 1-3.

\* cited by examiner

NAVIGATING A WEBSITE USING VISUAL ANALYTICS AND A DYNAMIC DATA SOURCE

BACKGROUND

The present invention relates generally to the field of social media, and more particularly to analytic visualization of a website.

Many websites contain social content, for example, comments, forums, discussions, or feeds. The issue with many social websites is that navigating the website's content is quite cumbersome. There are many pieces of content that may be in different locations that take time to browse or search for. This content often needs to be accesses using hierarchies of information, or links provided by others, browsing within forums, communities, reading lots of entries.

To navigate, websites have menus or filters, lists of most popular, most read, new feeds, or search may be used in order to let people find what is interesting on a website. The disadvantage of menus is that the content is mostly static and that every element in the menu has the same visual treatment, and each of the menu items have the same importance. Also, menu items are pre-determined and might not offer the right text to identify the content of interest. For example, using most read, most viewed, or most popular are often good starting-points, but the disadvantage is that the user cannot find information that might be in the lower percentile of popularity, causing users to find it difficult to engage with desired content, which may lead to disuse of the website. The disadvantage of search is that the user has to know where they are interested in, it is using memory as starting-point and not recognition.

SUMMARY

Embodiments of the present invention disclose a method, computer program product, and system for identifying relevant content in a social media website. A social media site is mined for data and that data is stored as a data set. The data set is identified using a computer. A plurality of electronic records of the data set are received, wherein the electronic records are a result of the data mining. A plurality of ontologies is generated based on the electronic records and a subset of the plurality of ontologies is displayed on a user device. A user input is recorded as a user record and the set of ontologies that is displayed is modified.

DETAILED DESCRIPTION

Figure 1:
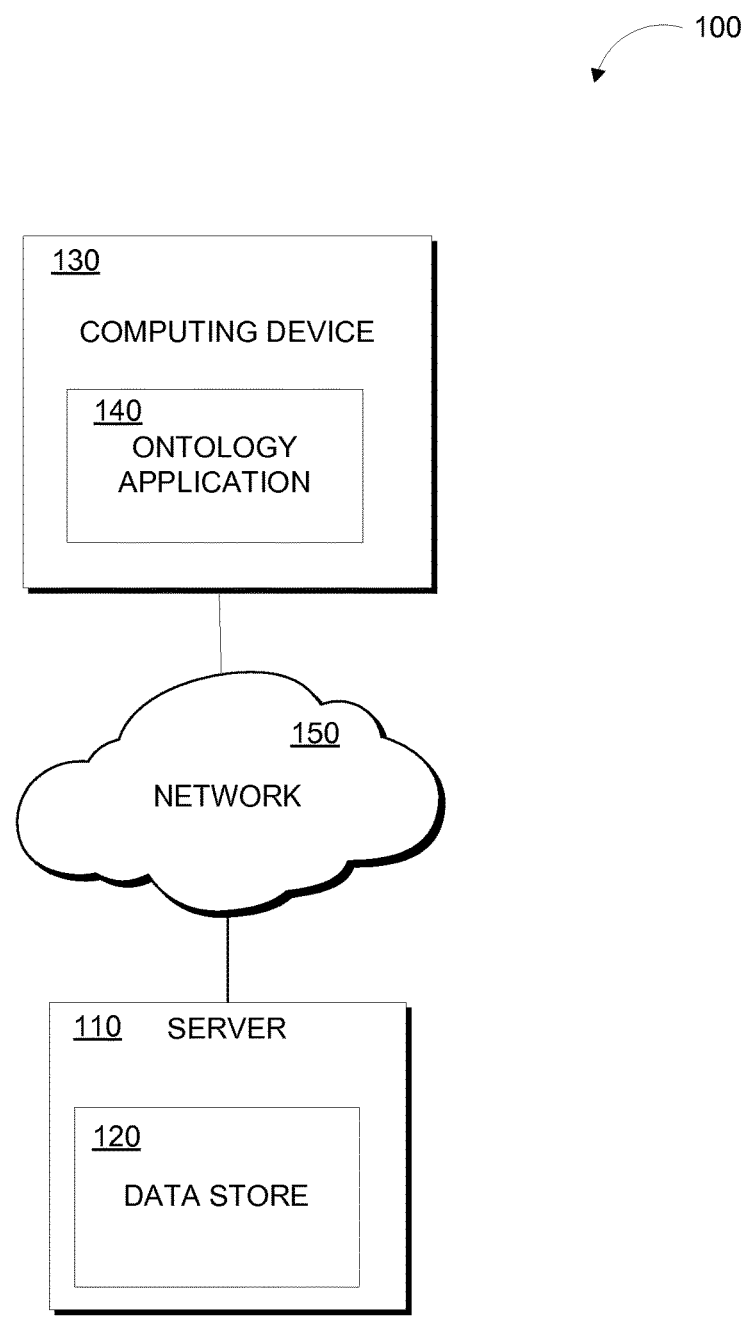
FIG. 1 is a functional block diagram illustrating a distributed data processing environment, in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many websites contain social content, like comments, forums, discussions, and twitter feeds. The issue with many social websites is that navigating the website's content is quite cumbersome. There are many pieces of interesting content that the user needs to discover. This interesting content often needs to be found by using hierarchies of information, or links provided by others, browsing within forums, communities, reading lots of entries, etc. Social media may be intimidating to new users that have no experience and users may be looking for relevant information regarding a topic of interest as opposed to pure social interaction.

Embodiments of the invention will now be described in detail in reference to the Figures. FIG. 1 is a functional block diagram illustrating a distributed data processing environment, generally designated 100, in accordance with an embodiment of the present invention.

Distributed data processing environment 100 includes server 110 and computing device 130, all interconnected over network 150.

Network 150 may include permanent connections, such as wire or fiber optic cables, or temporary connections made through telephone or wireless communications. Network 150 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 150 may also include a number of different types of networks, such as, for example, an intranet, a local area network (LAN), or a wide area network (WAN).

Each of server 110 and computing device 130 may be a laptop computer, tablet computer, netbook computer, personal computer (PC), desktop computer, smart phone, or any programmable electronic device capable of an exchange of data packets with other electronic devices, for example, through a network adapter, in accordance with an embodiment of the invention, and which may be described generally with respect to FIG. 5 below.

Server 110 may operation generally to send and receive data over network 150. Server 110 may also receive data from a client in the form of a set of data mined electronic records. Server 110 includes data store 120 that may index received electronic records to be communicated to computing device 130, in accordance with an embodiment of the invention.

Computing device 130 may operate generally to receive data, analyze data, and display results. Computing device 130 may communicate with server 110 via network 150. Computing device 130 includes ontology application 140, as described in greater detail below, with reference to FIG. 2. In various embodiments of the invention, ontology application 140 operates generally to receive input from a user, display data in a graphical user interface, or "GUI", or communicate over a network, for example a web browser.

In an embodiment of the invention ontology application 140 may receive, from data store 120 via server 110, a data set of electronic records from a social media website, via computing device 130. Ontology application 140 may analyze the data set for similar electronic records and generate topical hierarchies, or ontologies, for variously similar electronic records. In one embodiment semantic analysis may be used to determine similarity in electronic records and generate ontologies based on those semantic similarities. Other ontology generating techniques may be used and semantic analysis is merely an example of one technique.

Figure 2:
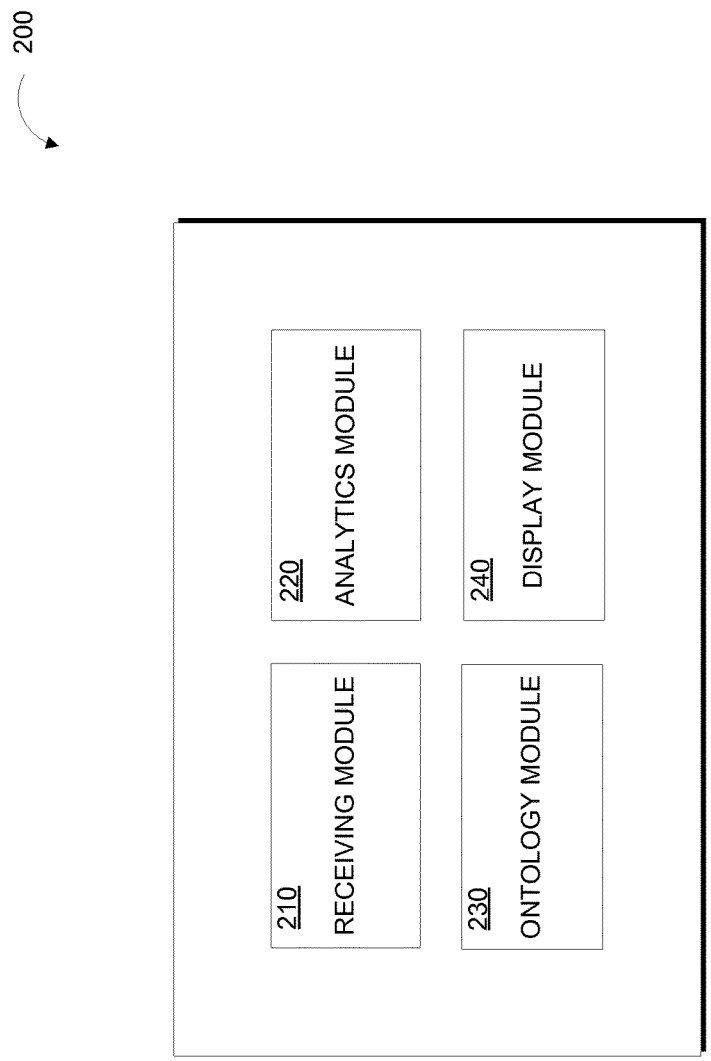
FIG. 2 is a functional block diagram illustrating components of an application running on a computing device of FIG. 1, in accordance with an embodiment of the present invention.

FIG. 2 is a functional block diagram illustrating components of an ontology application 140 running on computing device 130 of FIG. 1, in accordance with an embodiment of the present invention. Ontology application 140 includes receiving module 210, analytics module 220, ontology module 230, and display module 240, denoted generally as environment 200.

In an embodiment of the invention. Receiving module 210 may receive a data set of electronic records. In various embodiments, an electronic record may be a user input, an electronic comment, an electronic review, an electronic rating, an electronic description, or a social media posting. Receiving module 210 may also receive user input in the form of ontology selections, described below. Receiving module 210 may communicate the electronic records to analytics module 220.

Analytics module 220 may act generally to receive electronic records, analyze electronic records in order to determine similarities, generate ontologies based on those similarities, and communicate ontologies to ontology module 230. Analytics module 220 may receive electronic records from receiving module 210 and store the electronic records in a data store in memory. Analytics module 220 may perform an analysis of the received electronic records in order to determine topical similarities. This may be performed by various methods in the art, for example, semantic analysis of the textual data in the electronic records in order to determine corresponding categories or ontologies. The number of electronic records associated with an ontology may also be recorded by analytics module 220. Generated ontologies and the corresponding number of electronic records may be communicated by analytics module 220 to ontology module 230.

Ontology module 230 may act generally to receive ontologies from analytics module 220. Ontology module 230 may analyze the number of electronic records associated with each ontology and list the ontologies, for example, from the ontology with the greatest number of associated electronic records to the ontology with the least number of associated electronic records. Ontology module may generate a subset of ontologies where the subset of ontologies includes the ontologies with the most associated electronic records. The number of ontologies in the subset of ontologies may be predetermined by a user or developer. Ontology module 230 may communicate the subset of ontologies to display module 240.

Display module 240 may act generally to receive a subset of ontologies, determine a corresponding size value of each of the ontologies in the subset of ontologies, display the ontologies in the subset of ontologies, for example via a GUI, and receive user input based on an ontology selection.

In an embodiment of the invention, display module 240 may receive a subset of ontologies and a number for each ontology within the subset of ontologies, or "popularity value." A popularity value for an associated ontology may be based on the number of electronic records associated with that ontology from the analysis described above by ontology module 230. Display module 240 may analyze the popularity value and generate a "display size value." A display size value may represent the size an ontology will encompass in a GUI. For example, display module 240 receives three ontologies "music," "sports," and "games." Music may have a corresponding popularity value of 10 and sports and games may have popularity values of 5. Display module 240 may display ontologies music, sports, and games where music will take up half of the display and sports and games will take of a quarter of the display each.

In an embodiment of the invention, display module 240 may receive an electronic input from a user. The user input may correspond to an ontology selection of an ontology displayed via the GUI. Display module 240 may communicate the user selection to ontology module 230. Ontology module 230 may modify the popularity value of the user selected ontology and update the order of the list of ontologies based on the new popularity value of the user selected ontology. Based on the updated list of ontologies, ontology module 230 may communicate a new subset of ontologies to display module 240. Display module 240 may calculate new display size values for the new set of ontologies received from ontology module 230 and update the size of the ontologies in the GUI.

In another embodiment of the invention, display module 240 may communicate the ontology selection to analytics module 220 and analytics module 220 may communicate, to display module 240, the electronic records associated with the user selected ontology. Display module 240 may display, via the GUI, the electronic comments, reviews, ratings, descriptions, and/or social media postings associated with the selected ontology. The GUI may contain various interactive elements as described below, in reference to FIG. 4, allowing a user to navigate through one or more ontologies and the associated electronic records.

In various embodiments of the invention, the popularity values associated with ontologies may be modified based on a user's selection history or electronic records generated by a user associated with an account or "profile history". Display module 240 may generate a profile history by recording user selections in a data store in memory and communicating the user selections to ontology module 230 as described above. In various embodiments a profile history may be generated by receiving module 210. Receiving module 210 may receive a user name and password associated with a social media website, "profile information". Receiving module 210 may communicate to data store 120 via network 150 the social media website associated with received profile information. Receiving module 210 may receive electronic records from data store 120 associated with the profile information social media website or "profile records." Receiving module 210 may communicate profile records to analytics module 220 to be process as described above.

Figure 3:
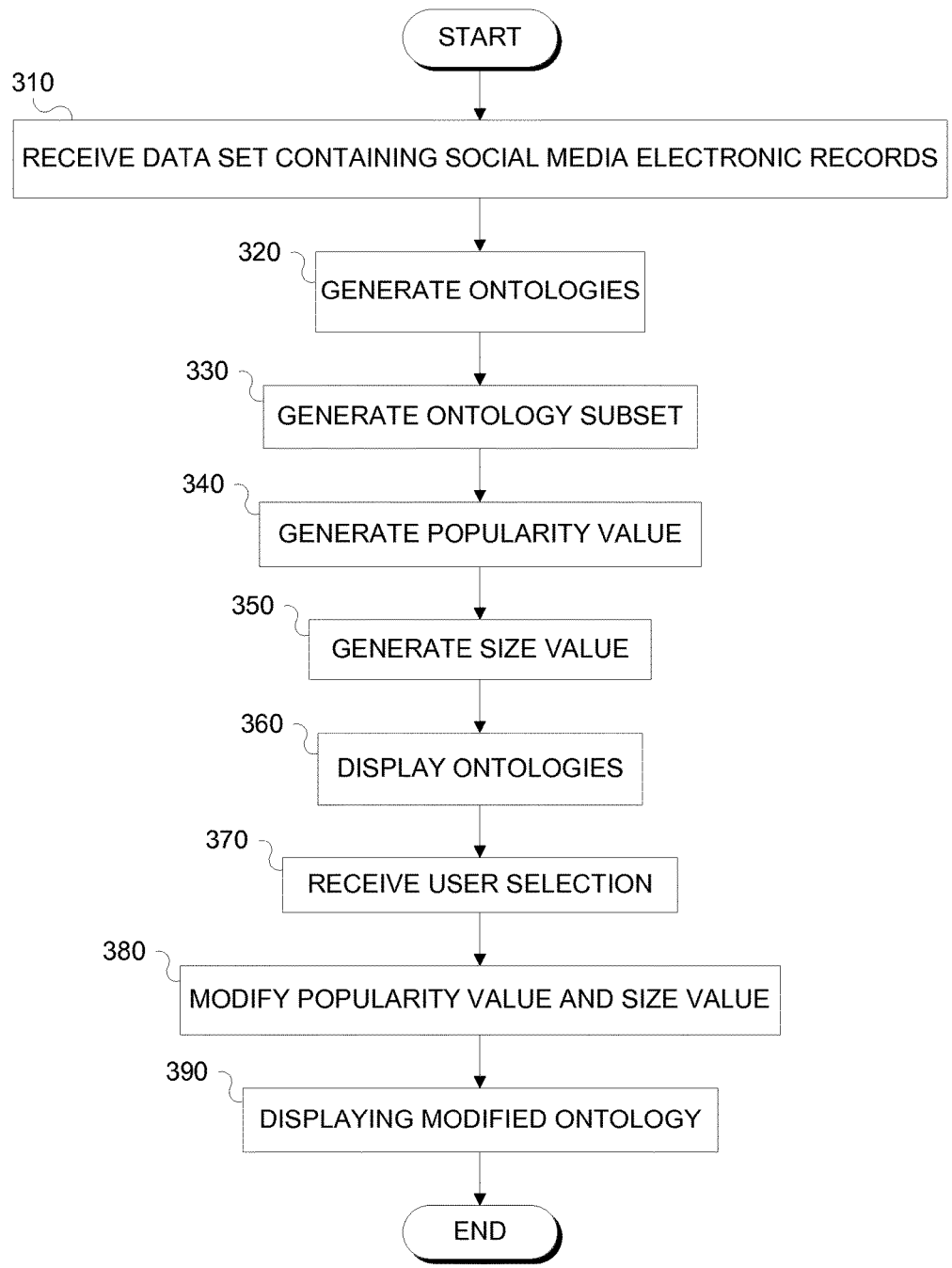
FIG. 3 is a flowchart depicting operational steps of an application receiving, analyzing, and displaying data, in accordance with an embodiment of the present invention.

FIG. 3 is a flowchart depicting operational steps of ontology application 140 receiving, processing, and displaying data, in accordance with an embodiment of the present invention. Now referring to FIGS. 1, 2, and 3, receiving module 210 receives a data set from data store 120. The data may contain electronic records from data mining a social media website or a profile history as described above in step 310. Receiving module 210 communicates the data set to analytics module 220. In step 320, analytics module 220 analyzes the received data set, for example, through semantic analysis, and generates ontologies corresponding to similarities in the electronic records. Analytic module 220 may record the number electronic records associated with each generated ontology in a data store in memory. Analytics module 220 communicates the generated ontologies to ontology module 230.

Ontology module 230 arranges the generated ontologies from the ontologies with the most associated electronic records to the least and generates a subset of ontologies, in step 330, where the subset represents the ontologies with the most associated electronic records. The number of electronic records associated with each ontology may be received by ontology module 230 in order to generate various subsets of ontologies, for example, a subset of ten ontologies with the highest number associated electronic records, or a subset of ten ontologies with the lowest number of associated electronic records. A subset of ontologies is communicated to display module 240. By generating a subset of ontologies for display, popular ontologies can be accessed by users unfamiliar with a social media site. These ontologies may enable the user to determine topics of interest.

Display module 240 assigns a popularity value to each ontology within the received subset of ontologies in step 340. The popularity value may be used to organize the ontologies in a list. Display module 240 generates a size value, in step 350, based on the popularity value. The size value may be, for example, the percentage of the area of the GUI designated by display module 240 that an ontology will occupy. In various embodiments, the higher size value may correspond with a greater area in the GUI occupied by an ontology. Display module 240 displays the ontologies via a GUI in step 360. The ontologies may be displayed, for example as boxes containing ontology labels or ontology labels in a word map.

Display module 240 receives an electronic input corresponding to a user selecting a displayed ontology in step 370. Display module 240 communicates the user selected ontology to ontology module 230. Based on the user selection, ontology module 230 modifies the selected ontologies popularity value, in step 380. The change in popularity value may change the position of the user selected ontology in the list of ontologies stored in a data store in memory by ontology module 230. Also in step 380, ontology module 230 may communicate the new popularity value to display module 240 and display module 240 may calculate a corresponding new size value for the user selected ontology, as described above. Display module 240 modifies the size of the user selected ontology, based on the new calculated size value, and displays the modified ontology in step 390.

Figure 4:
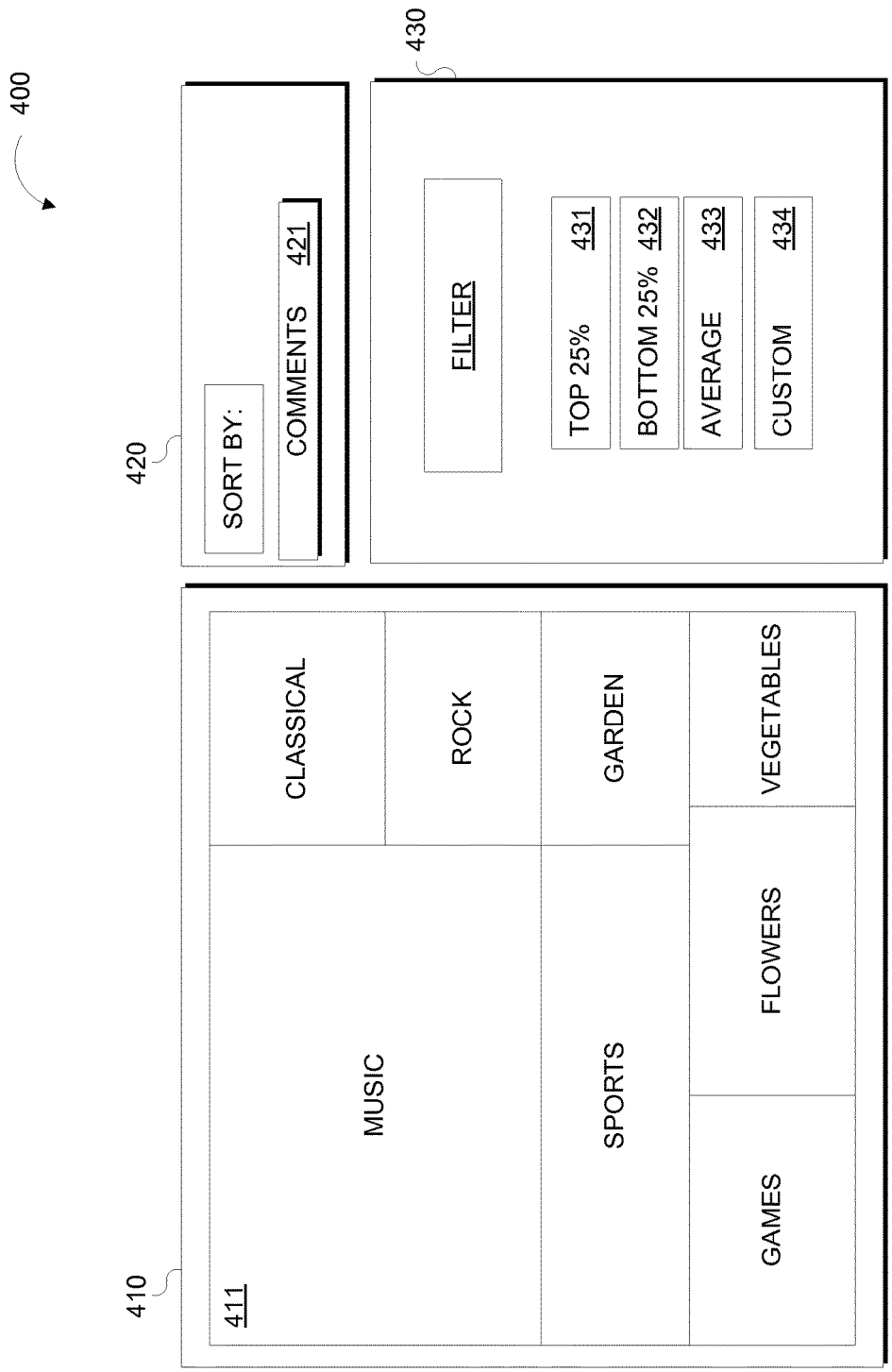
FIG. 4 is an illustrative depiction of an application display, in accordance with an embodiment of the present invention.

FIG. 4 is an illustrative depiction of a GUI displayed by ontology application 140, in accordance with an embodiment of the present invention. FIG. 4, referred to generally as display 400, is merely an example of a display generated by display module 240 including ontologies 410, menu 420, and filters 430. Ontologies 410 also include music ontology 411. The size of ontologies 410 may be determined by the corresponding calculated size value as described above. Display module 240 may receive an electronic input corresponding, for example, to a user selecting music ontology 411 within ontologies 410. Display module 240 may modify the size of music ontology 411 to increase or decrease the percentage of the displayed area of ontologies 410 music ontology 411 occupies.

Menu 420 may act generally as a selection tool in order to view ontologies based on specific electronic records. Menu 420 includes drop down menu 421. For example, a user may make a selection from drop down menu 421. The selection, for example, may be to return only ontologies associated with social media electronic comments. Display module 240 may display ontologies with associated electronic comments, in response to the user selection from drop down menu 421.

Filters 430 may act generally to allow the user to view other ontologies that may not have the highest popularity value. Filters 430 includes buttons top 25% 431, bottom 25% 432, average 433 and custom 434. Filters 430 represent merely an example of filters that can be applied to ontologies generated by analytics module 220. For example, the user may select one of filters 430, for example, bottom 25% 432, and display module 240 may display only ontologies that have the lowest associated popularity values. Various other methods of displaying ontologies may include a word map (not shown), for example, the ontologies with the largest size value may have the largest font size in the GUI display.

Figure 5:
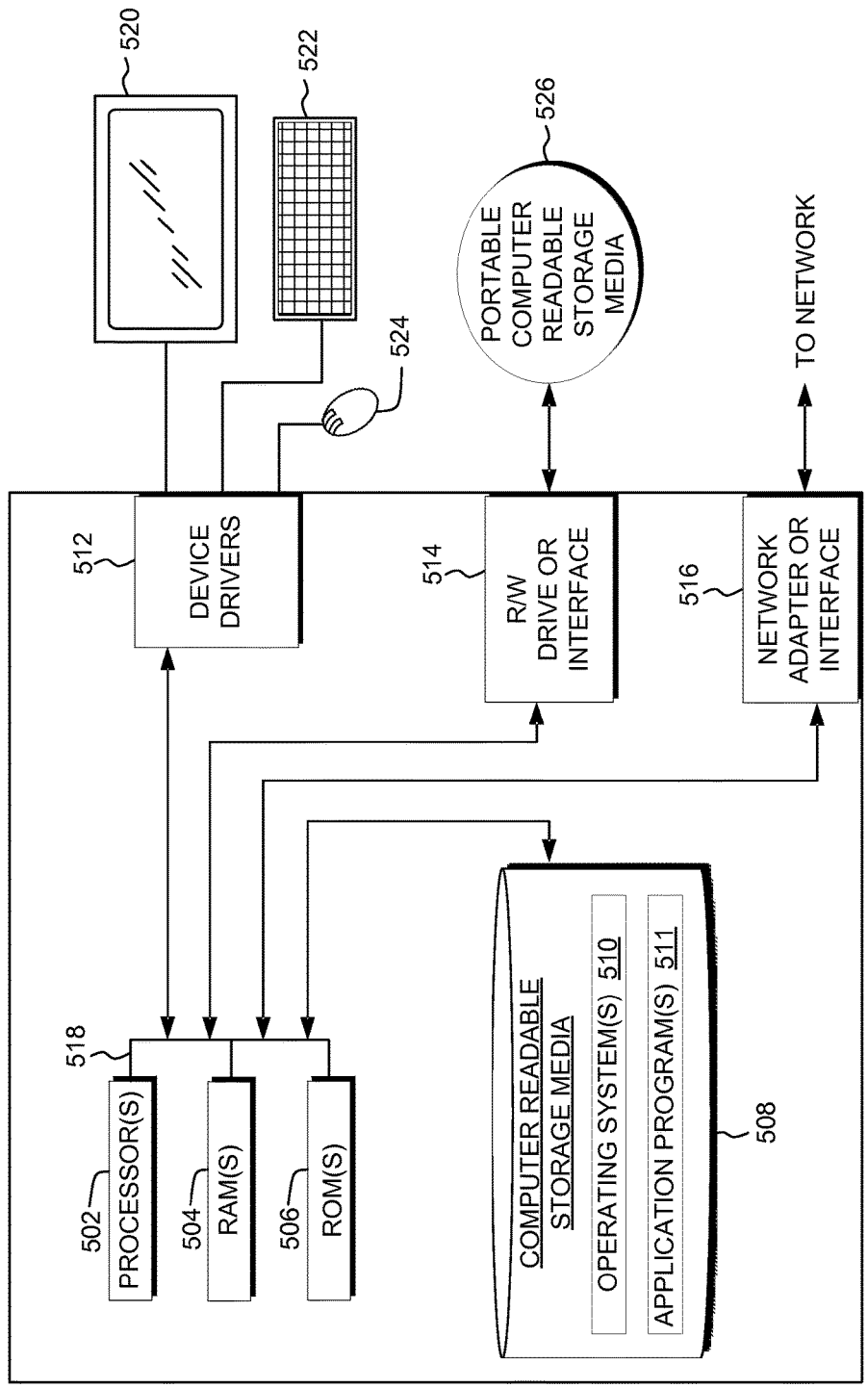
FIG. 5 depicts a block diagram of components of the computing device and server, in accordance with an embodiment of the present invention.

Referring now to FIG. 5 depicts a block diagram of components of computing device 130 and server 110 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 130 and server 110 may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, ontology application 140, are stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 130 and server 110 may also include a R/W drive or interface 514 to read from and write to one or more portable computer readable storage media 526. Application programs 511 on computing device 130 and server 110 may be stored on one or more of the portable computer readable storage media 526, read via the respective R/W drive or interface 514 and loaded into the respective computer readable storage media 508.

Computing device 130 and server 110 may also include a network adapter or interface 516, such as a TCP/IP adapter card or wireless communication adapter (such as a 4G wireless communication adapter using OFDMA technology). Application programs 511 on computing device 130 and server 110 may be downloaded to the computing device 130 from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing device 130 and server 110 may also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for identifying relevant content, the method comprising:
    identifying a data set using a computer, the data set being stored on a data storage device accessible by the computer;
    receiving a plurality of electronic records of the data set, wherein the electronic records further includes a set of electronic records resulting from data mining associated with social content on a plurality of social websites;
    generating a plurality of ontologies corresponding with one or more similarities associated with the plurality of electronic records, wherein the generated plurality of ontologies are based on an analysis of social content text associated with the data mined from the plurality of social websites;
    generating a first subset of ontologies of the plurality of ontologies for display on a user's device based on a popularity value, wherein the popularity value is based on a count of electronic records associated with the first subset of ontologies;
    determining a display size value based on the popularity value, wherein the display size value is a percent of a display of the user's device;
    displaying the first subset of ontologies based on the display size value, wherein the first subset of ontologies is displayed on a word map on a graphic user interface;
    recording a user record in a data store in response to receiving a user input selection of one or more of the subset of ontologies, wherein the user input selection includes a filter based on a range of levels associated with the popularity value on the one or more of the subset of ontologies and a menu to view one or more of the subset of ontologies based on one or more specific electronic records; and
    modifying, in real time, the first subset of ontologies for display on the user's device in response to the user input selection,
    wherein the modified first set of ontologies identifies one or more topics of interest associated with the plurality of electronic records,
    wherein the popularity value associated with the modified first set of ontologies is modified and a new display size value is calculated for the modified first set of ontologies.

2. The method of claim 1, wherein the plurality of electronic records includes one or more of:
    the user input;
    an electronic comment associated with the plurality of ontologies;
    an electronic review record of the plurality of ontologies;
    an electronic rating record of the plurality of ontologies;
    an electronic description record of the plurality of ontologies; and
    a social media posting associated with the plurality of ontologies.

3. The method of claim 1, wherein the identified data set is based on a user profile.

4. The method of claim 1, further comprises:
    in response to a user input, generating a subset of electronic records of the plurality of electronic records for display.

5. The method of claim 1, wherein the generated subset of ontologies is based on one or more of:
    the generated plurality of ontologies with the most associated electronic records; and
    the generated ontologies with the least associated electronic records.

6. A computer program product for identifying relevant content, the computer program product comprising:
    one or more computer-readable storage media and program instructions stored on the one or more computer-readable storage media, the program instructions comprising:
    instructions to identify a data set using a computer, the data set being stored on a data storage device accessible by the computer;
    instructions to receive a plurality of electronic records of the data set, wherein the electronic records further includes a set of electronic records resulting from data mining associated with social content on a plurality of social websites;
    instructions to generate a plurality of ontologies corresponding with one or more similarities associated with the plurality of electronic records, wherein the generated plurality of ontologies are based on an analysis of social content text associated with the data mined from the plurality of social websites;
    instructions to generate a first subset of ontologies of the plurality of ontologies for display on a user's device based on a popularity value, wherein the popularity value is based on a count of electronic records associated with the first subset of ontologies;
    instructions to determine a display size value based on the popularity value, wherein the display size value is a percent of a display of the user's device;
    instructions to display the first subset of ontologies based on the display size value, wherein the first subset of ontologies is displayed on a word map on a graphic user interface;
    instructions to record a user record in a data store in response to receiving a user input selection of one or more of the subset of ontologies, wherein the user input selection includes a filter based on a range of levels associated with the popularity value on the one or more of the subset of ontologies and a menu to view one or more of the subset of ontologies based on one or more specific electronic records; and
    instructions to modify, in real time, the first subset of ontologies for display on the user's device in response to the user input selection,
    wherein the modified first set of ontologies identifies one or more topics of interest associated with the plurality of electronic records,
    wherein the popularity value associated with the modified first set of ontologies is modified and a new display size value is calculated for the modified first set of ontologies.

7. The program product of claim 6, wherein the plurality of electronic records includes one or more of:
   the user input;
   an electronic comment associated with the plurality of ontologies;
   an electronic review record of the plurality of ontologies;
   an electronic rating record of the plurality of ontologies;
   an electronic description record of the plurality of ontologies; and
   a social media posting associated with the plurality of ontologies.

8. The program product of claim 6, wherein the identified data set is based on a user profile.

9. The program product of claim 6, further comprises:
   in response to a user input, program instructions to generate a subset of electronic records of the plurality of electronic records for display.

10. The program product of claim 6, wherein the generated subset of ontologies is based on one or more of:
    the generated plurality of ontologies with the most associated electronic records; and
    the generated ontologies with the least associated electronic records.

11. A computer system for identifying relevant content, the computer system comprising:
    one or more computer processors;
    one or more computer-readable storage media;
    program instructions stored on the computer-readable storage media for execution by at least one of the one or more processors, the program instructions comprising:
    instructions to identify a data set using a computer, the data set being stored on a data storage device accessible by the computer;
    instructions to receive a plurality of electronic records of the data set, wherein the electronic records further includes a set of electronic records resulting from data mining associated with social content on a plurality of social websites;
    instructions to generate a plurality of ontologies corresponding with one or more similarities associated with the plurality of electronic records, wherein the generated plurality of ontologies are based on an analysis of social content text associated with the data mined from the plurality of social websites;
    instructions to generate a first subset of ontologies of the plurality of ontologies for display on a user's device based on a popularity value, wherein the popularity value is based on a count of electronic records associated with the first subset of ontologies;
    instructions to determine a display size value based on the popularity value, wherein the display size value is a percent of a display of the user's device;
    instructions to display the first subset of ontologies based on the display size value, wherein the first subset of ontologies is displayed on a word map on a graphic user interface;
    instructions to record a user record in a data store in response to receiving a user input selection of one or more of the subset of ontologies, wherein the user input selection includes a filter based on a range of levels associated with the popularity value on the one or more of the subset of ontologies and a menu to view one or more of the subset of ontologies based on one or more specific electronic records; and
    instructions to modify, in real time, the first subset of ontologies for display on the user's device in response to the user input selection,
    wherein the modified first set of ontologies identifies one or more topics of interest associated with the plurality of electronic records,
    wherein the popularity value associated with the modified first set of ontologies is modified and a new display size value is calculated for the modified first set of ontologies.

12. The system of claim 11, wherein the plurality of electronic records includes one or more of:
    the user input;
    an electronic comment associated with the plurality of ontologies;
    an electronic review record of the plurality of ontologies;
    an electronic rating record of the plurality of ontologies;
    an electronic description record of the plurality of ontologies; and
    a social media posting associated with the plurality of ontologies.

13. The system of claim 11, wherein the identified data set is based on a user profile.

14. The system of claim 11, further comprises:
    in response to a user input, program instructions to generate a subset of electronic records of the plurality of electronic records for display.

15. The system of claim 11, wherein the generated subset of ontologies is based on one or more of:
    the generated plurality of ontologies with the most associated electronic records; and
    the generated ontologies with the least associated electronic records.

* * * * *